US010305287B2

(12) United States Patent
Hoerist et al.

(10) Patent No.: US 10,305,287 B2
(45) Date of Patent: May 28, 2019

(54) METHOD FOR OPERATING A PHOTOVOLTAIC SYSTEM

(71) Applicant: Siemens Aktiengesellschaft, Munich (DE)

(72) Inventors: Gerald Hoerist, Vienna (AT); Gerrit Puerstl, Vienna (AT); Alexander Trnka, Gerasdorf bei Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 192 days.

(21) Appl. No.: 15/253,194

(22) Filed: Aug. 31, 2016

(65) Prior Publication Data

US 2017/0070053 A1    Mar. 9, 2017

(30) Foreign Application Priority Data

Sep. 4, 2015  (EP) .................................... 15183893

(51) Int. Cl.
*H02J 1/00* (2006.01)
*H02J 3/00* (2006.01)
*H02J 3/38* (2006.01)
*H02M 1/36* (2007.01)
*H02S 40/32* (2014.01)
*H02S 40/38* (2014.01)
*H02J 3/46* (2006.01)
*H02M 3/158* (2006.01)

(52) U.S. Cl.
CPC .............. *H02J 3/385* (2013.01); *H02J 3/383* (2013.01); *H02J 3/46* (2013.01); *H02M 1/36* (2013.01); *H02S 40/32* (2014.12); *H02S 40/38* (2014.12); *H02M 3/1582* (2013.01); *Y02E 10/563* (2013.01)

(58) Field of Classification Search
CPC .. H02J 3/383; H02J 3/385; H02J 3/46; H02M 1/36; H02M 3/1582; H02S 40/32; H02S 40/38; Y02E 10/563
USPC .......................................................... 307/84
See application file for complete search history.

(56) References Cited

U.S. PATENT DOCUMENTS

| 7,733,072 | B2* | 6/2010 | Kanakubo | ........... H02M 3/1582 323/222 |
|---|---|---|---|---|
| 9,812,984 | B2* | 11/2017 | Yoscovich | .............. H02M 7/42 |
| 2002/0101745 | A1* | 8/2002 | Seki | ..................... H02M 1/083 363/65 |
| 2008/0150366 | A1 | 6/2008 | Adest et al. | |
| 2011/0205773 | A1 | 8/2011 | Wagoner et al. | |
| 2011/0291606 | A1* | 12/2011 | Lee | ....................... B60L 11/182 320/101 |
| 2012/0026769 | A1* | 2/2012 | Schroeder | ............... H02J 3/383 363/131 |

(Continued)

FOREIGN PATENT DOCUMENTS

WO    WO 2015/015531 A1    2/2015

*Primary Examiner* — Hal Kaplan
*Assistant Examiner* — Toan T Vu
(74) *Attorney, Agent, or Firm* — Cozen O'Connor

(57) ABSTRACT

A method for operating a photovoltaic system which includes solar panels, at least one DC-DC converter and an intermediate DC circuit, wherein the switching elements of the DC-DC converter are brought into a switching state which forms a permanent current path between the output of the solar panels and the intermediate circuit during a transition phase between an unloaded and loaded state of the solar panels.

7 Claims, 2 Drawing Sheets

(56) References Cited

U.S. PATENT DOCUMENTS

2014/0306541 A1 10/2014 Harrison et al.

* cited by examiner

METHOD FOR OPERATING A PHOTOVOLTAIC SYSTEM

BACKGROUND OF THE INVENTION

1. Field of the Invention

The invention relates to a method for operating a photovoltaic system, comprising solar panels, at least one DC/DC converter and an intermediate DC circuit.

2. Description of the Related Art

Photovoltaic systems serve to convert solar radiation into electrical energy. Such systems comprise individual solar cells, which are combined to form what are known as solar panels or photovoltaic panels. Depending on the size and type of the system, these are in turn electrically connected in series to form what are known as strings.

This adds together the voltage of the individual panels. If necessary, several of these strings can also be electrically connected in parallel with one another.

If this is a grid-tied photovoltaic system, the direct current generated in the solar panels is converted into alternating current by inverters so as to feed the generated electrical energy into the alternating current network, such as the public mains supply.

A maximum yield of electrical energy is achieved if the solar panels are operated in an operating point in which they output the maximum electrical power.

This optimal operating point MPP (Maximum Power Point) is achieved by controlling the load of the solar panels using an MPP tracking method.

In order to provide a sufficiently large variation range for the MPP tracking and to also be able to configure solar panels for a lower voltage, provision can be made for a multi-stage conversion of the voltage supplied by the solar panels. To this end, DC-DC converters are arranged upstream of the inverters. Their voltage transmission ratio is potentially highly variable, as a result of which the operating point of solar panels connected to the DC-DC converters can be varied over a wide range. Therefore with DC-DC converters that are formed as step-up converters, it is also still possible to feed into the power supply network if the output voltage of the solar panels is lower than the minimum required voltage of the inverter.

In particular, for cost reasons, the DC-DC converters are only designed for a limited input voltage range about the optimal operating point MPP (Maximum Power Point).

Such DC-DC converters are therefore not designed for the no-load voltage of the solar panels. This no-load voltage occurs, for instance, during sunrise or after a temporary shading of the solar panels, if no power is drawn from the solar cells.

In order, in these cases, to prevent damage to the DC-DC converters due to overvoltage, the solar panels are usually loaded during these phases with suitable facilities, such as contactors and resistors that are connected in parallel.

SUMMARY OF THE INVENTION

In view of the foregoing, it is an object of the invention to provide a method for operating a photovoltaic system comprising solar panels, at least one DC-DC converter and an intermediate DC circuit.

This and other objects and advantages are achieved in accordance with the invention by a method in which, during a transition phase between unloaded and loaded state of the solar panels, switching elements of the DC-DC converter are brought into a switching state which forms a permanent current path between the output of the solar panels and the intermediate circuit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail on the basis of an example embodiment with reference to the drawings in which.

DETAILED DESCRIPTION OF THE EXEMPLARY EMBODIMENTS

Figure 1:
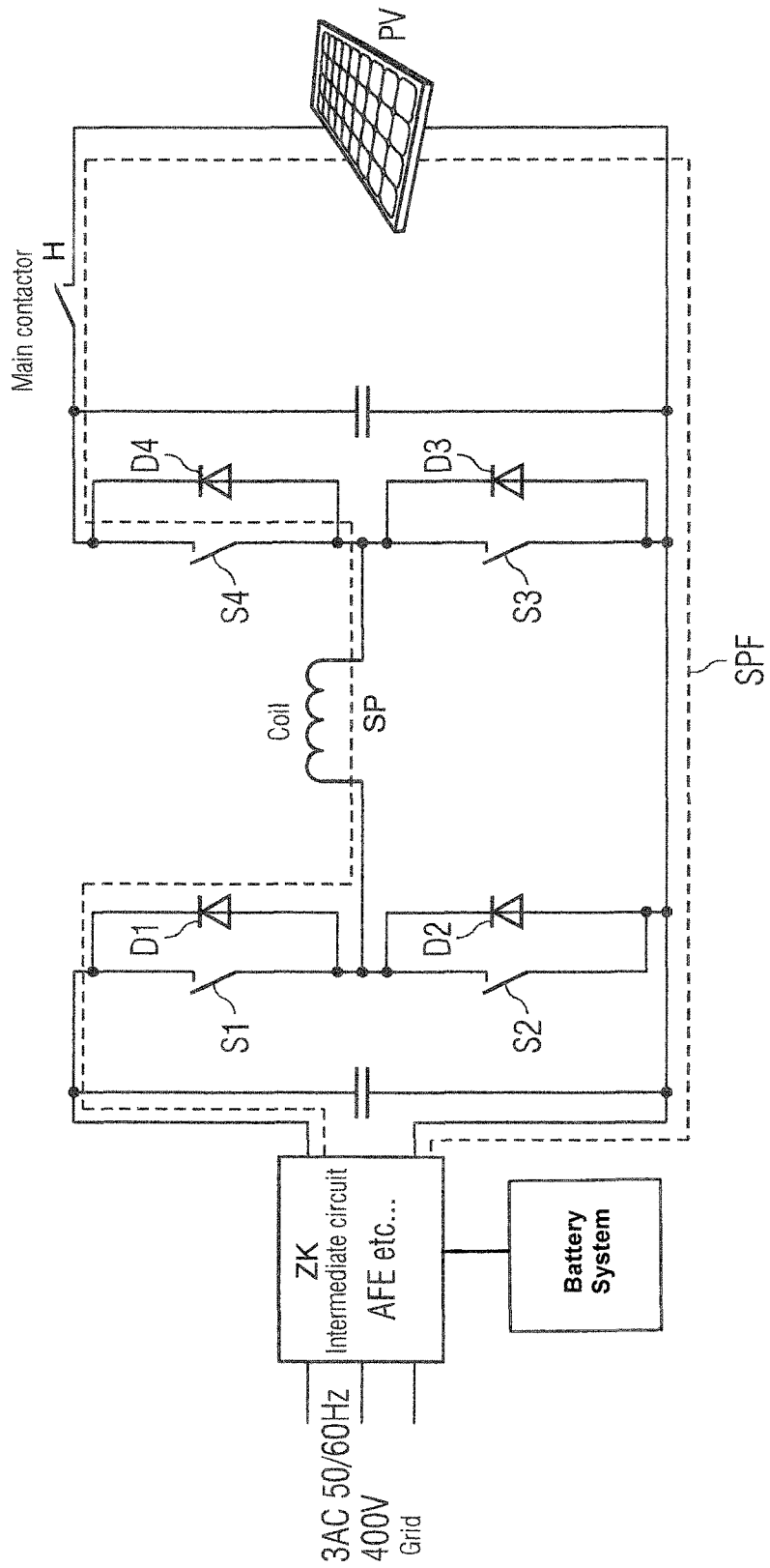
FIG. 1 is a schematic representation of a photovoltaic system in accordance with the system.

The system shown in FIG. 1 comprises a solar panel PV, a main contactor H, a DC-DC converter assembled from semiconductor switches S1, S2, S3, S4, a coil and freewheeling diodes D1, D2, D3, D4 and an intermediate DC circuit ZK.

Solar panels PV are assembled from individual solar cells. These may be connected electrically in series to form what are known as strings, in order thus to achieve higher output voltages. Crystalline or amorphous solar cells based on silicon can be provided as solar cells, for instance.

However, it should be understood the method in accordance with the invention is not restricted to a specific type of solar cell.

In the exemplary embodiment, a SINAMICS DCP-type DC-DC converter is provided as the DC-DC converter, the design of which corresponds to a buck-boost converter, where the switching elements of the DC-DC converter are formed as IGBT transistors.

Inverters can be connected to the intermediate DC circuit ZK, by way of which inverters the electrical energy generated by the solar panels by converting the radiation energy of sunlight, is fed into the AC voltage network.

It is conceivable, however, for the electrical DC voltage generated to be used to charge a battery system or to directly supply electrical loads with DC voltage.

One advantageous application can also consist in the solar panels PV, together with other current generators such as for instance wind power plants, being used in a multi-generator system.

The intermediate DC circuit and inverters can be realized using inverter components of the SINAMICS S120, type for instance.

The permitted value of the input voltage for correct operation of the cited DC-DC converter lies between 30V and 800V. This value can be exceeded with a corresponding connection of the solar panels in no-load operation.

In accordance with the prior art, it is therefore usual to reduce the no-load voltage via a short-circuit of the solar panels using a contactor, in order to draw the voltage into a permitted range.

This solution involves design engineering outlay that is avoided in accordance with the invention in that, in a transition phase between the unloaded and loaded state of the solar panels, the switching elements of the DC-DC converter are brought into a switching state that forms a permanent current path between the output of the solar panels and the intermediate circuit.

In the exemplary embodiment, this is achieved in that the main contactor H and the fourth switching element S4 are closed and the current path SPF via the main contactor H, the fourth switching element S4, the coil SP and the first free-wheeling diode D1 is closed so that the solar panel is loaded and the full no-load voltage cannot develop. As soon as the operating readiness of the solar panel, i.e., the required minimum power output, is reached, the DC-DC converter switches into the normal operating state, which effects an optimal power draw by controlling the load of the solar panels using an MPP tracking method.

Figure 2:
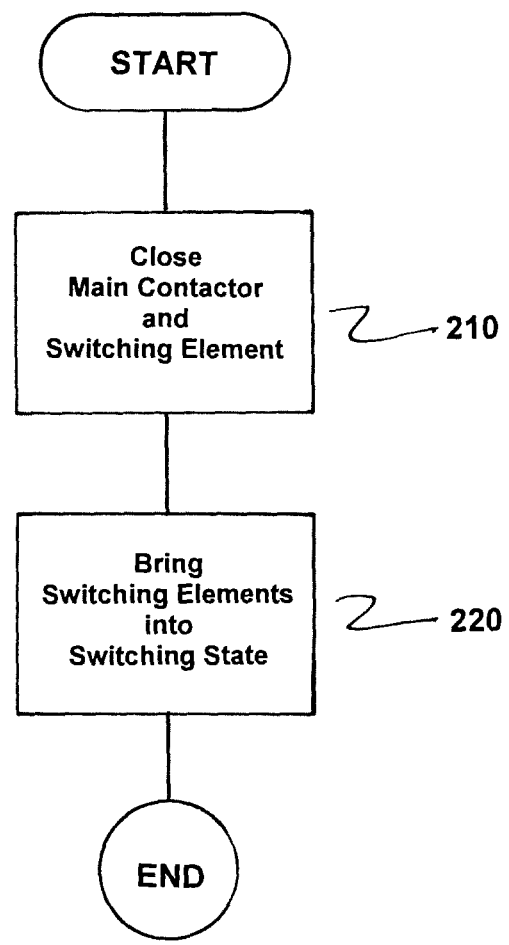
FIG. 2 is a flowchart of the method in accordance with the invention.

FIG. 2 is a flowchart of a method for operating a photovoltaic system comprising solar panels, at least one DC-DC converter and an intermediate DC circuit (ZK). The method comprises closing a main contactor and a switching element (S4) of a plurality switching elements, as indicated in step 210. Next, the plurality of switching elements (S1, S2, S3, S4) of the DC-DC converter are brought into a switching state which forms a permanent current path (SPF) between the output of the solar panels (PV) and the intermediate circuit (ZK) during a transition phase between an unloaded and loaded state of the solar panels, as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a photovoltaic system comprising solar panels, at least one DC-DC converter and an intermediate DC circuit, the method comprising:
    closing a main contactor and a switching element of a plurality of switching elements to close a current path via the main contactor, the switching element, a coil and a first free-wheeling diode such that the solar panels are loaded and a full no-load voltage cannot develop; and
    bringing the plurality of switching elements of the DC-DC converter into a switching state which forms a permanent current path between the output of the solar panels and the intermediate circuit during a transition phase between unloaded and loaded state of the solar panels.

2. The method as claimed in claim 1, wherein the at least one DC-DC converter comprises a buck-boost converter.

3. The method as claimed in claim 1, wherein the plurality of switching elements of the DC-DC converter comprise IGBT transistors.

4. The method as claimed in claim 2, wherein the plurality of switching elements of the DC-DC converter comprise IGBT transistors.

5. The method as claimed in claim 1, wherein at least one inverter for connection to an AC voltage network is connected to the intermediate DC circuit.

6. The method as claimed in claim 1, wherein a battery system for storing the electrical energy is connected to the intermediate DC circuit.

7. A photovoltaic system, comprising:
    solar panels;
    at least one DC-DC converter;
    an intermediate DC circuit;
    a switch for actuating the DC-DC converter and closing a current path via a main contactor, a coil and a first free-wheeling diode such that the solar panels are loaded and a full no-load voltage cannot develop and such that during a transition phase between an unloaded and loaded state of the solar panels, switching elements of the DC-DC converter have a switching state, which forms a permanent current path between an output of the solar panels and the intermediate circuit DC circuit.

* * * * *